United States Patent
Lamm et al.

[11] 3,827,411
[45] Aug. 6, 1974

[54] ROTARY PISTON INTERNAL COMBUSTION ENGINE OF TROCHOIDAL CONSTRUCTION

[75] Inventors: Heinz Lamm, Esslingen-St. Bernhardt; Lothar Kortner, Stuttgart, both of Germany

[73] Assignee: Daimler-Benz Aktiengesellschaft, Stuttgart-Unterturkheim, Germany

[22] Filed: Jan. 17, 1972

[21] Appl. No.: 218,170

[30] Foreign Application Priority Data
Jan. 15, 1971  Germany............................. 2101733

[52] U.S. Cl. ..... 123/119 R, 123/139 AW, 261/44 R
[51] Int. Cl............................................. F02b 33/00
[58] Field of Search ............... 123/119 R, 139 AW; 261/44 R

[56] References Cited
UNITED STATES PATENTS

| | | | |
|---|---|---|---|
| 1,231,886 | 7/1917 | Hendrix ............................ | 261/44 R |
| 1,412,137 | 4/1922 | Redmond.......................... | 261/44 R |
| 1,813,206 | 7/1931 | Shipman .......................... | 261/44 R |
| 2,754,812 | 7/1956 | Gianini............................. | 123/119 R |
| 3,006,326 | 10/1961 | Barford............................ | 123/119 R |
| 3,346,245 | 10/1967 | Mennesson ...................... | 123/119 R |
| 3,512,508 | 5/1970 | Winkler ........................... | 123/119 R |
| 3,587,534 | 6/1971 | Weichelt.......................... | 123/119 R |

FOREIGN PATENTS OR APPLICATIONS
2,726  11/1913  Great Britain........................ 261/44

Primary Examiner—C. J. Husar
Attorney, Agent, or Firm—Craig & Antonelli

[57] ABSTRACT

A rotary piston internal combustion engine of trochoidal construction which includes two throttle valves arranged in the inlet channel and an injection nozzle for the injection of fuel which is disposed within the area delimited by the two throttle valves and injects the fuel transversely into the flow of the sucked-in combustion air; both throttle valves are supported in the inlet channel at least approximately centrally thereof whereby the throttle valve disposed closer to the trochoidal space of the engine is supported immovably or in such a manner that it carries out rotary movements in unison with the other throttle valve and in the same direction.

12 Claims, 5 Drawing Figures

ROTARY PISTON INTERNAL COMBUSTION ENGINE OF TROCHOIDAL CONSTRUCTION

The present invention relates to a rotary piston internal combustion engine of trochoidal construction with two throttle valves arranged in the inlet channel and an injection nozzle disposed between the two throttle valves and provided for the injection of the fuel which injects the fuel transversely into the flow of the sucked-in combustion air as described in the co-pending application Ser. No. 122,882, assigned to the assignee of the present application, the subject matter of which is incorporated herein by reference to the extent necessary.

It is the aim of the present invention to improve in an advantageous manner arrangements made for a good mixture preparation in the air suction pipe or in the inlet channel of an internal combustion engine.

In order to be able to prevent with simple means that the fuel, especially at smaller partial loads, is injected into the air suction pipe within an area of slight turbulence formation and small gas velocity, and that a portion of the fuel wets the walls of the inlet channel and forms thereat a fuel streak adhering to the wall which reaches the trochoidal space under the suction effects and by the air stream only hesitatingly, the present invention proposes in a preferred embodiment also with respect to the aforementioned co-pending application that both throttle valves are supported centrally or at least approximately centrally whereby the throttle valve located closest to the trochoidal space is immovably supported or supported in such a manner that it carries out uni-directional rotary movements in unison with the second throttle valve.

Larger fuel drops sprayed off by the injection nozzle normally do not mix immediately with the air but instead precipitate on the oppositely disposed wall of the suction pipe. This disadvantage can be avoided according to the present invention by a throttle valve disposed downstream of the injection nozzle in relation to the direction of flow, which serves as deflection and evaporating surface for the fuel discharged from the injection nozzle.

In order to achieve a more strong turbulence and mixing of the sucked-in air with the fuel, the present invention provides that at least one of the throttle valves, preferably the throttle valves disposed closest to the trochoidal space, is provided with apertures permitting the passage therethrough of air or fuel-air mixture.

Accordingly, it is an object of the present invention to provide a rotary piston internal combustion engine of trochoidal construction which avoids by simple means the aforementioned shortcomings and drawbacks encountered in the prior art.

Another object of the present invention resides in a rotary piston internal combustion engine of trochoidal construction which assures an improvement in the mixture preparation.

A further object of the present invention resides in a rotary piston internal combustion engine of trochoidal construction in which a favorable fuel preparation is assured also at small partial loads.

Still another object of the present invention resides in a rotary piston internal combustion engine of the type described above which precludes a wetting of the walls of the inlet channel by fuel drops at smaller partial loads and therewith an adherence of the fuel at the walls of the inlet channel.

A further object of the present invention resides in a rotary piston internal combustion engine of trochoidal construction which achieves a more intense swirling and mixing of the sucked-in air with the injected fuel.

These and further objects, features and advantages of the present invention will become more apparent from the following description when taken in connection with the accompanying drawing which shows, for purposes of illustration only, two embodiments in accordance with the present invention, and wherein.

Figure 1:
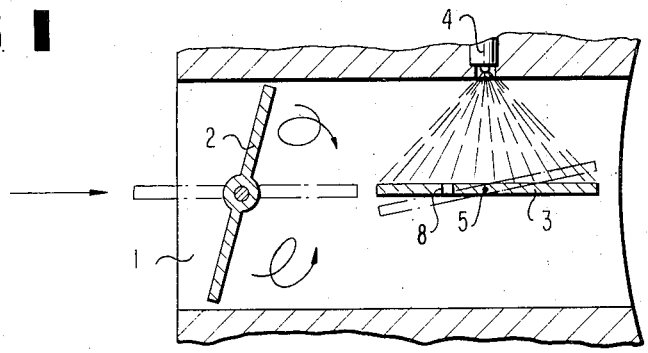
FIG. 1 is a partial longitudinal cross-sectional view through one embodiment of a rotary piston internal combustion engine provided with two throttle valves in the inlet channel of the internal combustion engine and with the throttle valves in the idling position.

Referring now to the drawing wherein like reference numerals are used throughout the various views to designate like parts, two throttle valves are arranged in the inlet channel 1 of a rotary piston internal combustion engine of trochoidal construction, which are centrally supported in the inlet channel 1, and of which the throttle valve controlling the air flow is designated by reference numeral 2 and the throttle valve serving as preparation surface by reference numeral 3. An injection nozzle 4 is disposed within the area delimited by the two throttle valves 2 and 3. Since the other details of the rotary piston internal combustion engine of trochoidal construction are known as such and form no part of the present invention, a detailed description and showing thereof is dispensed with herein.

The arrangement of the throttle valves 2 and 3 illustrated in FIG. 1 is made in such a manner that the throttle valve 3 mounted downstream of the rotatable throttle valve 2 — in relation to the direction of flow — is arranged immovably and parallel or possibly at a flat angle to the direction of flow (as shown in dash lines). The injection nozzle 4 which is used as pin, swirl or counter-jet nozzle, which is disposed above the bearing place 5 of the throttle valve 3 injects the fuel perpendicularly or approximately perpendicularly, depending on the installation position of the throttle valve 3, over the entire preparing surface of the throttle valve 3 which either possesses a closed, porous and rough surface (for example sprayed-on ceramics, bronze, or sprayed-on aluminum) or consists of a porous material permeable to air and fuel (for example coarse or fine-mesh wire fabric, apertured sheet metal, honeycombed ceramics, etc.), in order to assure a more favorable evaporation and mixing of the fuel with the air. Therebeyond the mixture formation especially in the idling and at partial loads can be improved by preparation surfaces adapted to be electrically heated by conventional means.

Figure 2:
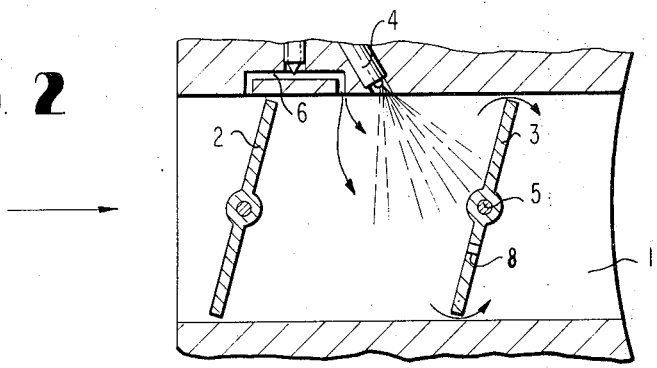
FIG. 2 is a partial longitudinal cross-sectional view, similar to FIG. 1, of a modified embodiment of a rotary piston internal combustion engine provided with two throttle valves arranged in the inlet channel of an internal combustion engine and with the throttle valves in the idling position thereof.
Figure 3:
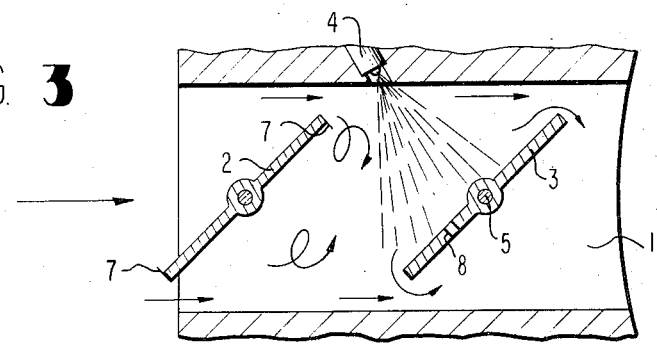
FIG. 3 is a partial longitudinal cross-sectional view through the internal combustion engine of FIG. 2, showing the throttle valves in the partial load position.
Figure 4:
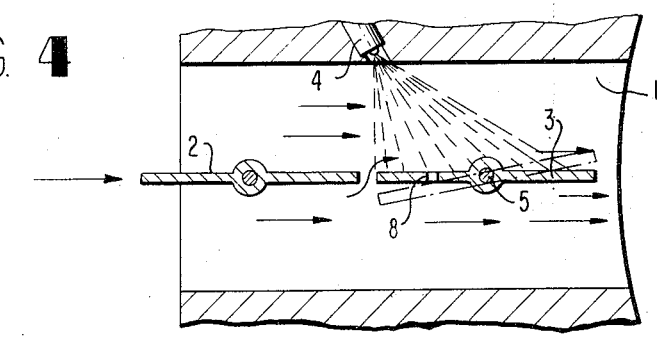
FIG. 4 is a partial longitudinal cross-sectional view through the internal combustion engine of FIGS. 2 and 3, with the throttle valves thereof in the full load position.

In the embodiment illustrated in FIGS. 2, 3 and 4 the throttle valves 2 and 3 shown in the inlet channel 1 and to be controlled in unison carry out rotary movements in the same direction of rotation. Any conventional means may be used to provide such rotary movements in unison between the two throttle valves 2 and 3. The injection nozzle 4 is arranged approximately in the center between the two throttle valves 2 and 3 and is directed with its longitudinal axis approximately toward the axis of rotation of the throttle valve 3. According to FIG. 2 the fuel jet wets predominantly the lower half of the throttle valve 3 disposed in the idling position. The control throttle valve 2 provided within the area of an idling channel 6, which is not hit by the fuel jet, is normally closed in the idling position. In contradistinction thereto, the throttle valve 3 has to be opened with a small gap.

The throttle valve 2 may be provided with small openings or apertures 8 through which a part of the idling air enters (about 60 percent of the idling air) in order to achieve a good mixture formation together with the injected fuel. The adjustment of the entire idling air quantity, however, takes place by means of the idling screw 9 in the idling channel 6. Whereas the fuel jet in the partial load position according to FIG. 3 impinges only in part on the throttle valve 3 (similarly as in the idling position), in the full load position according to FIG. 4 the preparation surface of the throttle valve 3 is wetted in its entirety whereby the main proportion of the mixture formation takes place in the upper channel section as viewed in FIG. 4. A leaner mixture is present in the lower channel portion which once again mixes with the richer mixture from the upper channel portion when entering the trochoidal space of the engine.

Both throttle valves 2 and 3 are provided with foiler edges 7 for increasing the turbulence formation (as can be seen from FIG. 3 for throttle valve 2) which bring about a more intense mixture preparation.

The throttle valves 2 and 3 may also rotate, if necessary, with a predetermined mutual phase displacement whereby the trailing throttle valve 3, adjusted in the position of "full-load" which is indicated in FIG. 4 in dash lines, forms a small angle to the flow direction. Any known mechanical linkage or connection may be used to provide the differing rotary movement of the two throttle valves with the desired phase shift and at the desired different varying speeds to achieve the respective positions thereof as illustrated in FIGS. 2, 3 and 4, particularly as illustrated in dash line in FIG. 4. Since such mechanisms are known as such, a detailed description thereof is dispensed herein.

Figure 5:
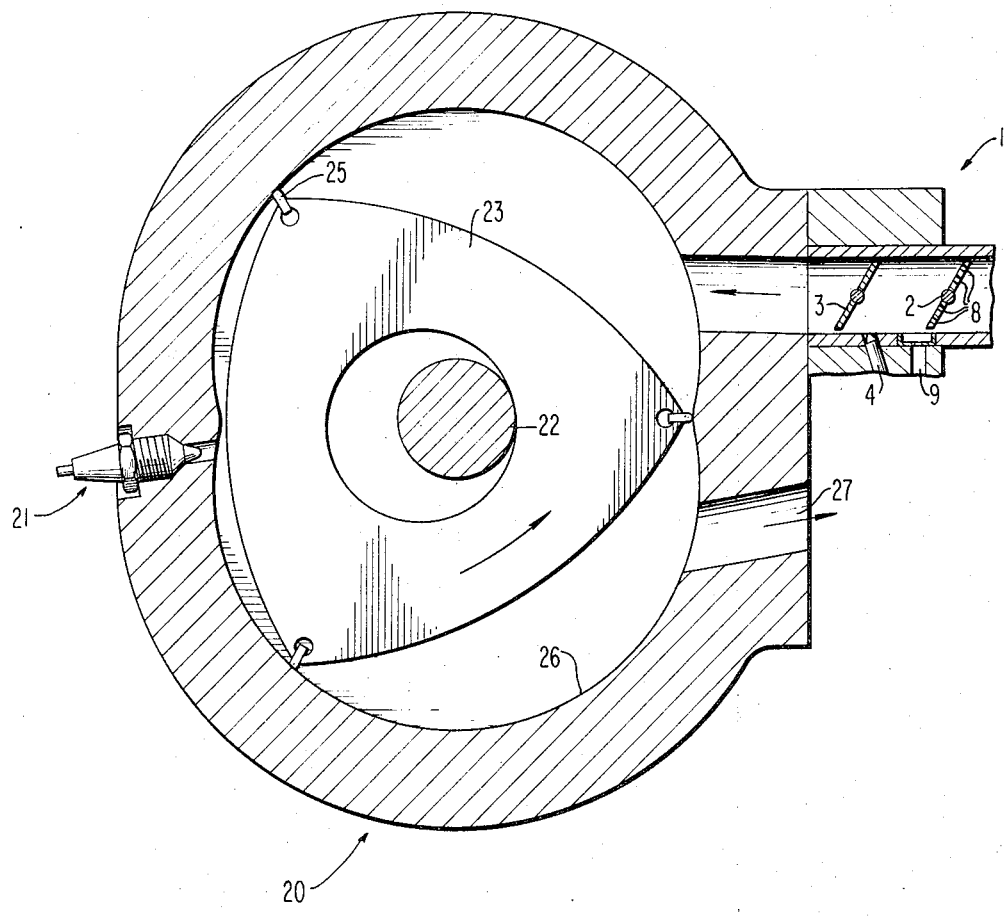
FIG. 5 is a cross-sectional view through a rotary piston engine of trochoidal construction to which the present invention applies.

In FIG. 5, reference numeral 20 generally designates the casing of the internal combustion engine of trochoidal construction, shown only schematically which is provided with a trochoidally shaped running surface 26. A piston 23 mounted for rotation on an eccentric shaft 22 slides with its piston corners provided with conventional sealing bars 25 along the running surface 21. A firing device such as a spark plug is indicated schematically by reference numeral 21 while the exhaust port is designated by reference numeral 27. The inlet channel 1 is thereby connected with the casing in any suitable manner.

While we have shown and described only two embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. A rotary piston internal combustion engine of trochoidal construction with a trochoidal space, comprising an inlet channel means, two throttle valve means centrally disposed in said inlet channel means in close proximity to each other, an injection nozzle means disposed within the area of said inlet channel means approximately defined by said two throttle valve means for injecting fuel substantially transversely into sucked-in combustion air, means for assuring increased evaporation and mixing of the injected fuel with the combustion air provided on the throttle valve means disposed closer to the trochoidal space of the engine upon which the fuel from said injection nozzle means is directly injected, said preparation surface being disposed at least in the full load position thereof, generally in the direction of the axis of the inlet channel means.

2. A rotary piston internal combustion engine according to claim 1, wherein said throttle valve means disposed closest to the trochoidal space of the engine is immovably supported in said inlet channel means.

3. A rotary piston internal combustion engine according to claim 2, wherein said means for assuring increased evaporation and mixing of the injected fuel with the combustion air is disposed parallel to the axial direction of the inlet channel means.

4. A rotary piston internal combustion engine according to claim 2, wherein said means for assuring increased evaporation and mixing of the injected fuel with the combustion air forms a small angle to the axial direction of the inlet channel means.

5. A rotary piston internal combustion engine according to claim 1, wherein both of said throttle valve means are rotatably supported in said inlet channel means, and wherein said throttle valve means disposed closer to the trochoidal space carries out rotary movements in the same direction of rotation together with the other throttle valve means.

6. A rotary piston internal combustion engine according to claim 1, wherein said means for assuring increased evaporation and mixing of the injected fuel with the combustion air includes surface means provided on said throttle valve means serving as baffle and evaporating surface for the fuel discharged from said injection nozzle means.

7. A rotary piston internal combustion engine according to claim 6, wherein at least one of said two throttle valve means is provided with aperture means.

8. A rotary piston internal combustion engine according to claim 7, wherein said throttle valve means provided with the aperture means is said throttle valve means disposed closer to the trochoidal space.

9. A rotary piston internal combustion engine according to claim 8, wherein said throttle valve means disposed closest to the trochoidal space of the engine is immovably supported in said inlet channel means.

10. A rotary piston internal combustion engine according to claim 8, wherein both of said throttle valve means are rotatably supported in said inlet channel means, and wherein said throttle valve means disposed closer to the trochoidal space carries out rotary movements in the same direction of rotation together with the other throttle valve means.

11. A rotary piston internal combustion engine according to claim 1, wherein at least one of said two throttle valve means is provided with aperture means.

12. A rotary piston internal combustion engine according to claim 11, wherein said throttle valve means provided with the aperture means is said throttle valve means disposed closer to the trochoidal space.

* * * * *